March 17, 1964 W. G. HERRIDGE, JR., ETAL 3,125,702
VEHICLE LIGHT CONTROL
Filed June 17, 1959

INVENTORS
William G. Herridge, Jr.
Robert G. Taylor
BY
C. R. Meland
Their Attorney 3,125,702
VEHICLE LIGHT CONTROL
William G. Herridge, Jr., and Robert G. Taylor, Flint, Mich., assignors to General Motors Corporation, Detroit, Mich., a corporation of Delaware
Filed June 17, 1959, Ser. No. 820,915
4 Claims. (Cl. 315—77)

This invention relates to vehicle light controls and to switching apparatus for controlling the energization of motor vehicle illumination lamps.

One of the objects of the present invention is to provide a vehicle light control system wherein the illuminating lamps of the vehicle are de-energized automatically after the engine is turned off or comes to rest.

A further object of this invention is to provide a vehicle light control system wherein the illuminating lamps of the vehicle are de-energized automatically and at a time delay following the time that the engine is turned off or comes to rest.

Another object of this invention is to provide a vehicle light control system that includes a switch having a movable contact actuator, the switch including detent means controlled as a function of operation of the vehicle engine for holding the contact actuator in predetermined positions.

Another object of this invention is to provide a circuit controller that includes a movable switch actuator and a vacuum motor for detenting the switch actuator in predetermined positions.

Still another object of this invention is to provide a light control system for a motor vehicle that includes an electric switch having a movable actuator that is constantly biased in one direction, there being a vacuum motor operated detent for holding the movable actuator in predetermined positions against the force of the biasing means.

A further object of this invention is to provide a vehicle lighting system wherein the illumination lamps of the vehicle are automatically extinguished by a switch after the engine is turned off and wherein the movable actuator may be manually actuated to energize certain lamps when the vehicle engine is not operating.

Further objects and advantages of the present invention will be apparent from the following description, reference being had to the accompanying drawings, wherein a preferred embodiment of the present invention is clearly shown.

Figure 1:
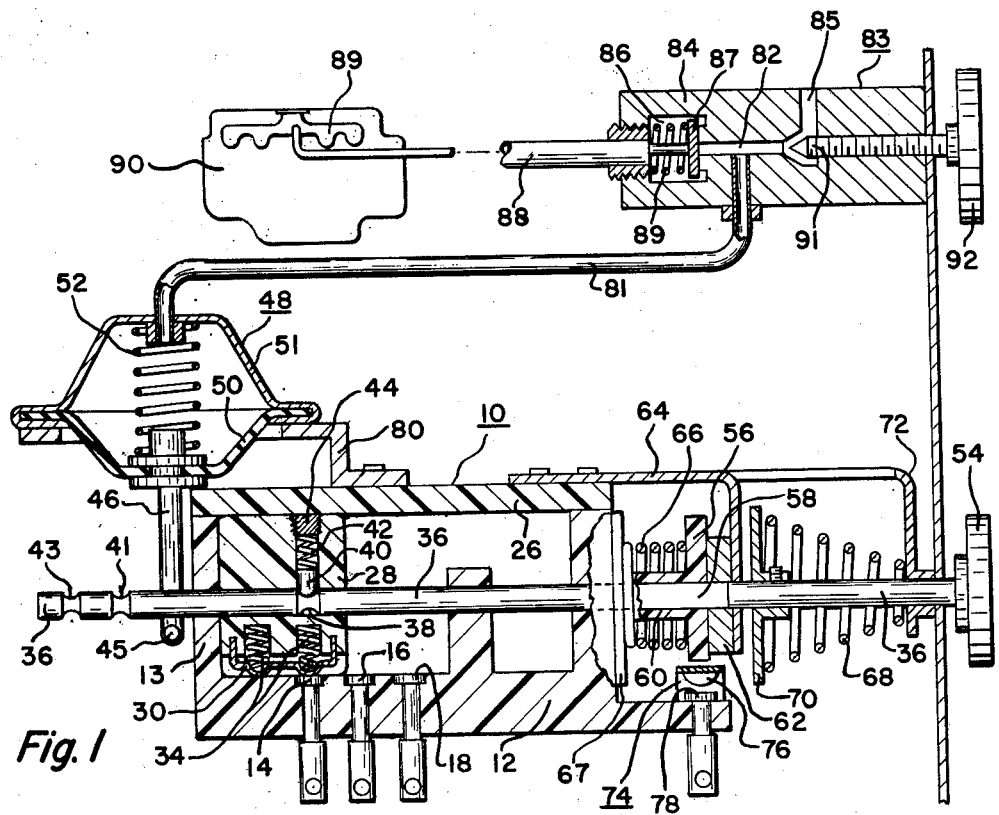
FIGURE 1 is a sectional view illustrating the circuit controller of this invention.

Referring now to the drawings and more particularly to FIG. 1, it is seen that a circuit controller is provided which is generally designated by reference numeral 10. This circuit controller has a housing or base formed of insulating material designated by reference numeral 12, which carries a plurality of fixed electrical contacts designated by reference numerals 14, 16, 18, 20, 22 and 24. The fixed contacts 20, 22 and 24 are illustrated in the circuit diagram of FIG. 2 and it is to be understood that they are located in side by side relationship with the fixed contacts 14, 16 and 18 illustrated in FIG. 1. A cover member designated by reference numeral 26 is provided which is secured in any suitable manner to the upstanding wall of housing member 12. A movable contact carrier formed of insulating material and designated by reference numeral 28 slides between the housing 12 and the cover member 26. This contact carrier 28 carries a pair of electrical contacts designated respectively by reference numerals 30 and 32. The contact 32 is not illustrated in FIG. 1, but it is to be understood that it is supported in side by side relationship with the contactor 30. The contactor 30 is biased into engagement with the lower wall of housing 12 by a pair of springs designated by reference numeral 34. It is to be understood that the movable contact 32 in a like manner is spring biased into contact with the lower wall of housing 12 and thus into contact with fixed contacts 20, 22 and 24 as the contact actuator 28 is moved axially within the switch.

The contact carrier or actuator 28 is moved by a rod which is designated by reference numeral 36. This rod has a reduced portion 38 which is engaged by a spring biased detent 40 held in position by spring 42 and a set screw 44 which are located within an opening formed in the contact carrier 28. The rod 36 is provided with a pair of reduced portions 41 and 43 which cooperate with a pin 45 supported by an actuating rod 46 of a vacuum motor generally designated by reference numeral 48. The vacuum motor has a movable diaphragm 50 which is normally in the position illustrated in FIG. 1 and held in this position by a spring designated by reference numeral 52. When vacuum pressure is applied to the interior of vacuum motor 48, it moves the actuator 46 upwardly against the force of spring 52 and the pin 45 will snap into reduced positions 41 and 43 depending upon the axial movement of the rod 36.

The rod 36 is connected with an actuating knob 54 and is also connected with a switch actuating part designated by reference numeral 56. The rod over the portion designated by reference numeral 58 may be polygonal in cross-section and the switch actuating part 56 is formed of insulating material and has a bore 60 which conforms to the cross-section of the portion 58. Thus the portion 58 of the rod may be triangular in cross-section and the bore 60 of the switch actuating part 56 may likewise be triangular in cross-section. With this construction the rod 36 is slidable axially relative to the switch actuating part 56, but when the rod 36 is rotated, the switch actuating part 56 rotates therewith. The switch actuating part 56 is held against a member 62 which in turn is held against a part of bracket 64 by a spring designated by reference numeral 66. A spring seat designated by reference numeral 67 is positioned against the housing 12 and contacts the spring 66.

The movable actuator 28 of the switch 10 is constantly urged to a position wherein it contacts an end wall 13 of the housing 12 by means of a spring designated by reference numeral 68. It is seen that this spring 68 is interposed between a spring seat 70 and a bracket designated by reference numeral 72 which is fixed with respect to the switch housing 12. The spring seat member 70 is secured to the rod 36 so that the spring 68 constantly urges the switch actuator 28 against the wall 13 of the switch and as will become readily apparent hereinafter, urges the switch to an off position.

The switch actuator 56, which is rotatable with rod 36, operates a switch designated by reference numeral 74 and including a movable contact 76 formed of spring metal material and a fixed contact 78. The switch has another fixed contact 77 shown in FIG. 2, but not shown in FIG. 1. The switch actuator 56 preferably is formed with a cam lobe, not shown, which urges the movable contactor 76 into engagement with the fixed contacts 77 and 78 when the rod 36 is rotated.

The vacuum motor 48 is supported from the cover 26 of the switch by means of a bracket designated by reference numeral 80. As noted hereinbefore, the vacuum motor 48 has a movable diaphragm 50 which is fixed to a housing 51 of the motor. The interior of vacuum motor 48 is connected with a pipe designated by reference numeral 81 which is in turn connected to a central passage 82 of a valve generally designated by reference numeral 83. The valve 83 comprises a valve block 84 in which is formed the central passage 82 and a passage designated by reference numeral 85 which is connected to atmosphere. The valve block 84 has a chamber 86 in which is positioned a check valve 87 that is spring biased by spring 89 to close off the connection between passage 82 and a pipe 88. The pipe 88 is connected with the intake manifold 89 of an internal combustion engine designated by reference numeral 90 that serves to provide motive power for the motor vehicle. The passage area or opening between chamber 82 and passage 85 is adjustable by a valve member designated by reference numeral 91. This valve member is threaded into valve block 84 and may be adjusted by a manual actuation of knob 92. It will be appreciated that the adjustment of valve member 91 will control the time required for the spring 52 to force the actuator rod 46 downwardly once the pipe 82 has been disconnected from vacuum pressure. It will also be appreciated that when the engine 90 is operating, the check valve 87 will be unseated so that the vacuum motor is supplied with vacuum via pipe 81. When the engine is not operating the check valve 87 will close the connection between passage 82 and pipe 88 and air at atmospheric pressure will bleed into the vacuum motor 48 past the valve member 91. This will cause some time delay in the movement of actuator 46 and will therefore cause some time delay in the shifting of the switch member 10 as will become more readily apparent hereinafter.

Figure 2:
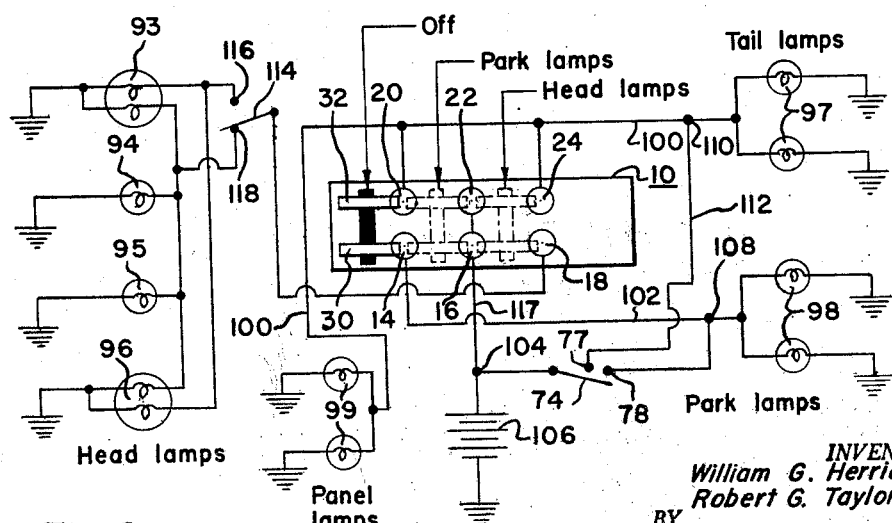
FIGURE 2 is a circuit diagram illustrating the use of the circuit controller of this invention in controlling the various illuminating lamps of a motor vehicle lighting system.

Referring now more particularly to FIG. 2, the head lamps of the vehicle lighting system are designated respectively by reference numerals 93, 94, 95 and 96. The tail lamps of the vehicle lighting system are designated by reference numeral 97, whereas the parking lamps of the vehicle are designated by reference numeral 98. The panel lamps of the vehicle are designated by reference numeral 99. It is seen that the head lamps 93 and 96 include two filaments, one side of each being connected directly to ground. In a like manner the lamps 94 and 95 have one side thereof connected to ground as do the tail lamps, parking lamps and panel lamps. The tail lamps 97 have their opposite sides connected with a lead wire 100 which is in turn connected with fixed contacts 20 and 24 of the switch. The panel lamps 99 are likewise connected with lead wire 100 as is clearly apparent from the circuit diagram of FIG. 1. The parking lamps 98 are connected with a lead wire 102 which is connected with fixed contact 14 of switch 10. The fixed contact 16 of switch 10 is connected with a junction 104 and is also connected to one side of storage battery 106. The opposite side of storage battery 106 is connected directly to ground as shown. Junction 104 is connected with a junction 108 through the fixed contact 78 of the switch designated by reference numeral 74 and illustrated in FIG. 1. The junction 104 is likewise connected with a junction 110 via fixed contact 77 and lead wire 112. It can be seen that when the switch 74 is closed by a rotation of rod 36, both the parking lamps and tail lamps will be energized from battery 106.

The fixed contact 18 of switch 10 is connected with a movable contactor 114 which forms part of a dimmer switch and which cooperates with fixed contacts 116 and 118. It is seen that fixed contact 116 is connected to one of the filaments of head lamps 93 and 96, whereas the fixed contact 118 is connected with the other filaments of head lamps 93 and 96 and with the filaments of head lamps 94 and 95. The fixed contacts 16 and 22 of switch 10 are both connected with battery 106 via a lead wire 117.

It can be seen from the foregoing that when the movable contacts 30 and 32 are in the full leftward position, as illustrated in the drawings, none of the illuminating lamps of the vehicle are energized. When the contacts 30 and 32 are shifted to the right to a position wherein they respectively connect fixed contacts 20 and 22 and 14 and 16, the parking lamps and tail lamps of the vehicle will be energized as is clearly apparent from the circuit diagram of FIG. 2. The panel lamps will also be energized in this position of switch 10. When the switch actuator 28 is moved fully to the right, wherein movable contacts 30 and 32 respectively connect fixed contacts 16 and 18 and 22 and 24, the head lamps of the vehicle will be energized as well as the tail lamps and the panel lamps.

If it is assumed that the switch is in the position illustrated in FIG. 1 and that the engine is in operation, the actuator 46 will be moved upwardly so that the pin 45 contacts the rod 36. If the operator of the vehicle now grasps the actuating knob 54 and pulls the rod 37 rightwardly, the detent pin 45 will snap into the recessed portion 41 of the rod 36 to hold the actuator 28 in a position wherein the parking lamps, tail lamps and panel lamps are energized. If the operator of the vehicle moves the rod 36 fully rightwardly, the detent pin 45 will snap into the recess 43 to hold the switch actuator 28 in a position wherein the head lamps, tail lamps and panel lamps of the vehicle are energized. If the engine is now turned off the actuator 46 will move downwardly to release the rod 36 following a predetermined time delay which is dictated by the adjustment of valve member 91. Once the pin 45 leaves either the recess 41 or 43, the spring 68 will force the contact carrier 28 fully leftwardly against the wall 13 to completely deenergize all of the illuminating lamps of the vehicle. If the vehicle operator desires to cause an energization of the parking lamps, tail lamps and panel lamps, the rod 36 is simply rotated to cause a closure of switch 74 and an energization of these lamps. This rotating of the rod 36 may occur at any axial position of the contact carrier 28, and it is therefore apparent that the parking lamps and tail lamps may be energized even though the contact carrier 28 is being held in its off position by the spring 68.

While the form of embodiment of the invention as herein disclosed constitutes a preferred form, it is to be understood that other forms might be adopted.

What is claimed is as follows:

1. In combination, a motor vehicle having an engine, an illuminating lamp, a voltage source, electrical switch means including a movable member for controlling the connection of said illuminating lamp with said voltage source, biasing means constantly urging said movable member to a position wherein said lamp and voltage source are disconnected, manually operable means for shifting said movable member against the force of said biasing means, shiftable detent means at times engageable with said movable member to hold it in a position wherein said lamp and voltage source are connected once said movable member has been manually shifted, means normally urging said detent means out of engagement with said movable member, and means operating in response to a running condition of said engine for shifting said detent means into engagement with said movable member.

2. In combination, a motor vehicle having an engine, an illuminating lamp, a voltage source, electrical switch means including a movable member for controlling the connection of said illuminating lamp with said voltage source, biasing means constantly urging said movable member to a position wherein said lamp and voltage source are disconnected, manually operable means for shifting said movable member against the force of said biasing means, shiftable detent means at times engageable with said movable member to hold it in a position wherein said lamp and voltage source are connected once said movable member has been manually shifted, means normally urging said detent means out of engagement with said movable member, a vacuum motor for shifting said detent means into engagement with said movable member, and means connecting said vacuum motor with the intake manifold of said engine.

3. In combination, a motor vehicle having an engine, an illuminating lamp, a voltage source, electrical switch means including a movable member for controlling the connection of said illuminating lamp with said voltage source, biasing means constantly urging said movable member to a position wherein said lamp and voltage source are disconnected, manually operable means for shifting said movable member against the force of said biasing means, shiftable detent means at times engageable with said movable member to hold it in a position wherein said lamp and voltage source are connected once said movable member has been manually shifted, means normally urging said detent means out of engagement with said movable member, a vacuum motor for shifting said detent means into engagement with said movable member, means connecting said vacuum motor with the intake manifold of said engine, and restricted passage means connecting said vacuum motor with the atmosphere.

4. In combination, a motor vehicle having an engine, an exterior illuminating lamp, a voltage source, shiftable means for forming a conductive path that electrically connects the illuminating lamp with the voltage source, a manually operable actuator for moving said shiftable means to a position wherein it connects the voltage source and the illuminating lamp, biasing means constantly urging said shiftable means to a position wherein said lamp and voltage source are disconnected, detent means for holding said shiftable means in a position wherein it connects said lamp and voltage source once said shiftable means has been manually shifted by said manually operable actuator to this position, means normally urging said detent means to a position wherein it is ineffective to hold said shiftable means, and means operating in response to a running condition of said engine for urging said detent means into a position wherein it is capable of holding said shiftable means in a position that connects said voltage source and illuminating lamp.

References Cited in the file of this patent
UNITED STATES PATENTS

| | | |
|---|---|---|
| 1,928,978 | Koch | Oct. 3, 1933 |
| 2,045,274 | Kundig | June 23, 1936 |
| 2,267,602 | Claytor | Dec. 23, 1941 |
| 2,380,491 | Ball | July 31, 1945 |
| 2,669,664 | Poznik | Feb. 16, 1954 |
| 2,751,522 | Spangenberg | June 19, 1956 |
| 2,862,148 | Weigl et al. | Nov. 25, 1958 |
| 2,888,611 | Matkins | May 26, 1959 |